H. D. TIEMANN.
PROCESS OF REGULATING AND MAINTAINING HUMIDITY.
APPLICATION FILED DEC. 8, 1909.
981,818.
Patented Jan. 17, 1911.
3 SHEETS—SHEET 1.
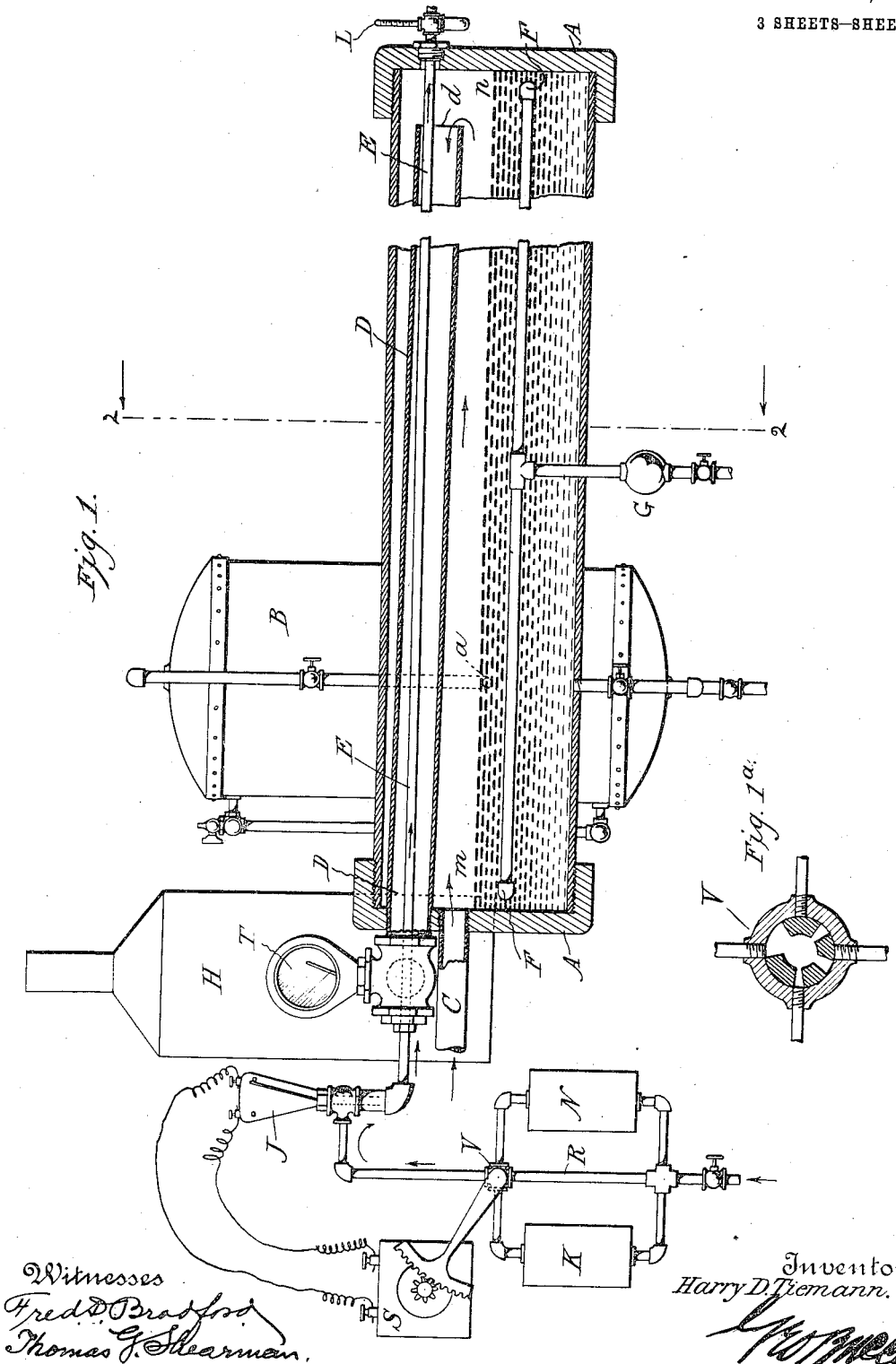
Witnesses
Fred D. Bradford
Thomas G. Stearman
Inventor
Harry D. Tiemann.
Attorney

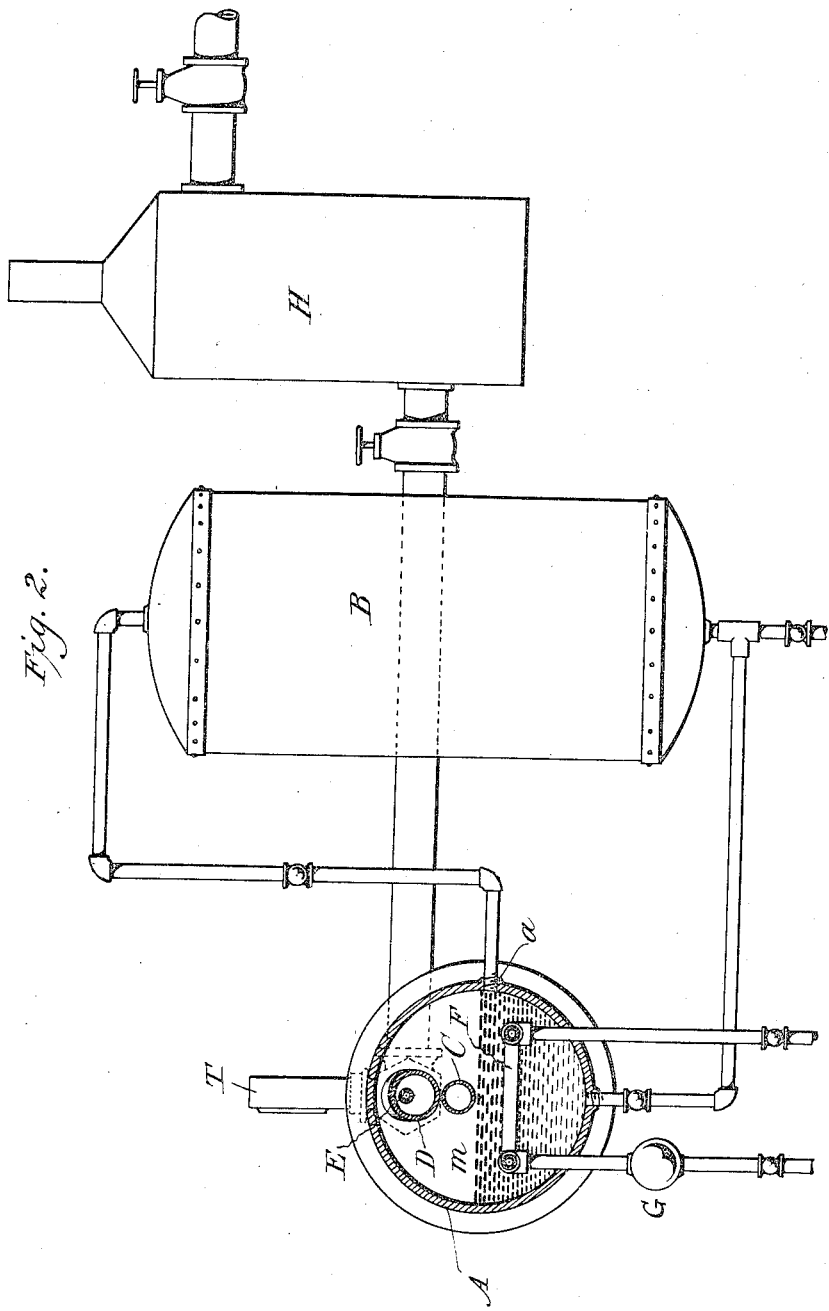

H. D. TIEMANN.
PROCESS OF REGULATING AND MAINTAINING HUMIDITY.
APPLICATION FILED DEC. 8, 1909.
981,818.
Patented Jan. 17, 1911.
3 SHEETS—SHEET 3.
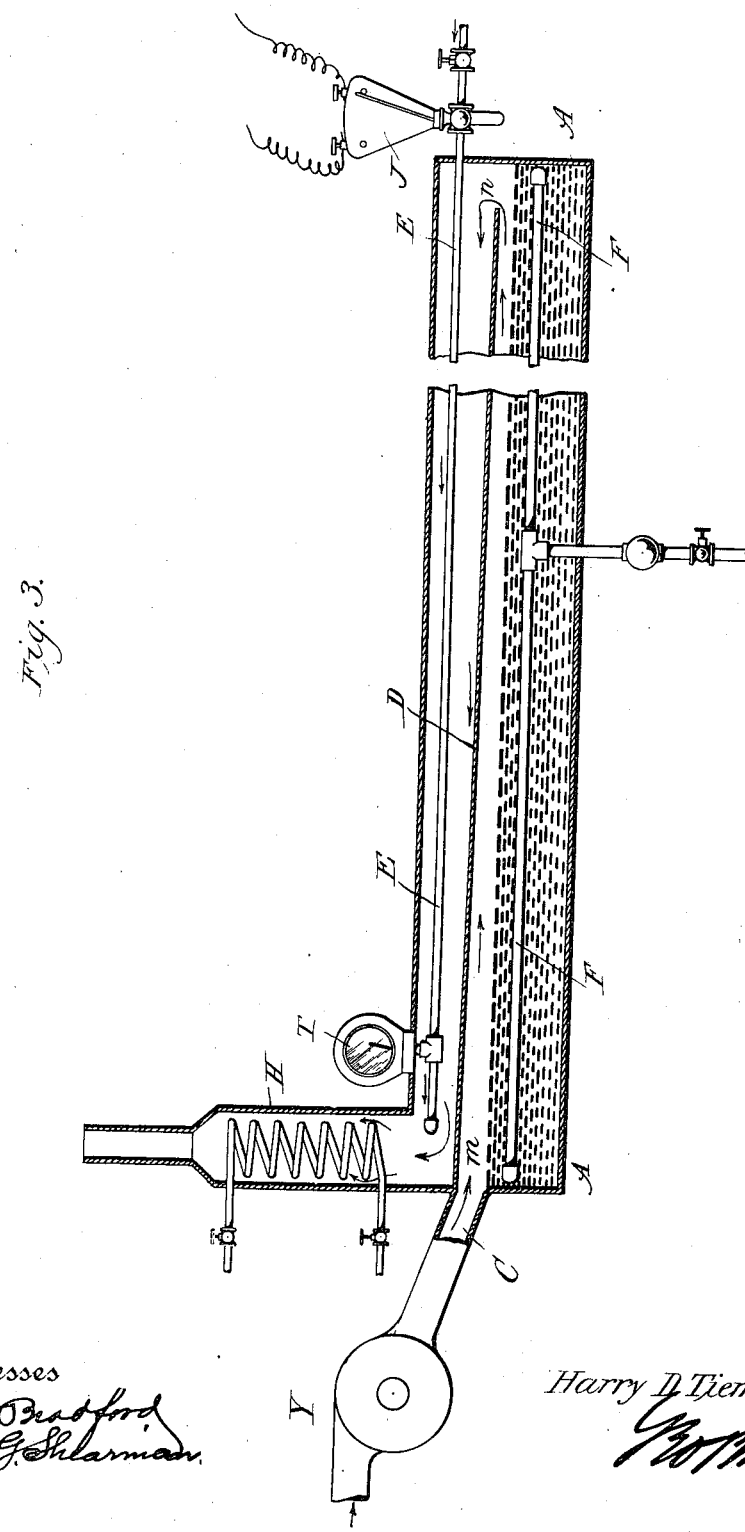
Witnesses
Fred D. Bradford
Thomas G. Shearman
Inventor
Harry D. Tiemann.
Attorney

UNITED STATES PATENT OFFICE.

HARRY D. TIEMANN, OF WASHINGTON, DISTRICT OF COLUMBIA.

PROCESS OF REGULATING AND MAINTAINING HUMIDITY.

981,818.  Specification of Letters Patent.  Patented Jan. 17, 1911.

Application filed December 8, 1909. Serial No. 532,009.

(DEDICATED TO THE PUBLIC.)

*To all whom it may concern:*

Be it known that I, HARRY D. TIEMANN, a citizen of the United States, and an employee of the Department of Agriculture, Forest Service, residing in the city of Washington, District of Columbia, whose post-office address is No. 1714 Q street northwest, Washington, District of Columbia, have invented a new and useful Process of Regulating and Maintaining Humidity, of which the following is a specification.

This application is made under the act of March 3, 1883, chapter 143 (22 Stat., 625), and the invention herein described and claimed may be used by the Government of the United States or any of its officers or employees in the prosecution of work for the United States, or by any person in the United States, without the payment of any royalty thereon.

The object of my invention is to provide a method of producing and maintaining any desired relative humidity within a vessel or chamber at any temperature or pressure.

It is applicable to drying materials in gas under pressures greater or less than atmospheric, or, it may be used at atmospheric pressure in connection with dry kilns, or for humidifying rooms and maintaining the air at the desired humidity.

I am aware that many inventions have been made for humidifying and regulating the humidity of the air. They are based on the principle of bringing a current of air up to the point of saturation at a given temperature by means of contact with heated water or water vapor and removing excess moisture which is in the form of fine particles, drops or mist, by some form of separator, and then heating the saturated air up to the required final temperature at which it is to be delivered to the chamber. My method differs essentially from the preceding in that I obtain a definite predetermined vapor tension or absolute humidity by taking partially or wholly saturated gas at a slightly higher temperature than that giving the required vapor tension, and reducing its dewpoint the desired amount by contact with a surface maintained at the corresponding predetermined temperature, subsequently heating the air or gas to the desired degree. The dewpoint is the temperature of saturated vapor, and always bears a fixed and well known relation to the vapor tension or the absolute mass of vapor present in a given space, whether other gas be present or absent. By way of distinction, my method may therefore be designated as the "dew point method."

The operation of my process is based upon the following laws of psychrometry. At a given temperature a fixed space can contain no more than a definite mass of vapor and this will have a fixed pressure, it matters not whether other gas be present or absent. The space is then said to be saturated, and the given temperature is the dew point, as stated above. If less than this amount of vapor be present at the given temperature, the space is not saturated, the vapor being superheated. The relative humidity is the ratio of the actual vapor tension existing in a given space to the vapor tension required to saturate the space at the given temperature.

In operating my process I use a current of saturated or nearly saturated gas at a higher temperature than that of the required dew point. The gas may be saturated in any convenient manner. This current is then brought in contact with a condensing surface which is kept at a fixed predetermined temperature depending upon the humidity desired. The vapor in the gas is thus cooled slightly below its original dew point and is brought to a definite tension and a new dew point corresponding to the fixed temperature of the condenser. The temperature of the condenser thus determines the actual dew point of the gas as it leaves the condenser and consequently its vapor tension. The gas is then heated, without change of pressure, to whatever final temperature is desired. By altering the temperature of the condenser and thus the dew point, any desired degree of humidity may be obtained. Moreover, it makes no difference at what pressure the air or gas is used. For example, suppose a final humidity of 60 per cent. is desired at a temperature of 140° F. The vapor pressure of saturation at 140° is 5.86 inches of mercury. 60 per cent. of 5.86 is 3.52, which corresponds to a dew point of 121° F. Therefore, the temperature of the condenser must be maintained at 121° F. in this case.

In order to accomplish this result I have designed the apparatus illustrated herewith, but I do not restrict myself to the use of any particular form of apparatus, as other forms may be used to the same purpose.

Figure 1 is a sectional elevation of an apparatus for use with gas under high pressure, in which the two processes of saturating and then condensing to the required dew point are very simply combined in one vessel. Fig. 1ª is a detail sectional view of the regulating valve. Fig. 2, similarly lettered throughout is a cross-sectional view of the same, taken at the place marked "2—2" in Fig. 1; and Fig. 3, is a vertical longitudinal sectional view of a modified form of such apparatus.

A A is a metal cylinder capable of withstanding the required pressure. This may be a piece of ordinary steam pipe with caps screwed on each end. It is half filled with water up to the level m n. In the water is a coil of steam pipe F F. Through the space above the water passes a pipe E E, which acts as a condenser and through which is circulated a fluid to control its temperature. Enveloping the condensing pipe E is a large pipe D which separates it from the surrounding space but does not extend the full length of the outer cylinder, ending abruptly at d. The water level m n is maintained constant automatically by the supply vessel B. This is very simply accomplished by gravity. The bottom of B is connected to the bottom of A, and the top of B to the side of A through an orifice a on the line m n. B is then filled with water and closed hermetically except for the two connections with A. The water flows out the bottom of B into A so long as the orifice a is open, but when the water covers this orifice the back pressure prevents it from doing so. As soon as evaporation causes the water level to fall below a, gas again enters the top of B and more water flows out until a readjustment takes place. The tank is so arranged that it may be entirely closed off from the cylinder and refilled with water.

The gas enters the cylinder A through pipe C just above the surface of the water, it traverses the length of the cylinder in contact with the water and enters the condenser at d. It then traverses the length of the cylinder again back through the pipe D in contact with the condenser E, from which it passes immediately to the heater H where the temperature is raised to the final degree desired. It will be noticed that all drip from the condenser flows back into the humidifier m n. The most important factor in the operation is to have the condenser at the proper temperature and a sufficient circulation through the pipe E to keep it at nearly a uniform temperature from end to end. For this purpose a thermostat J is placed in the pipe E just before it enters the cylinder, which controls the heater or cooler. It will suffice to merely make mention of the parts of this temperature-regulating apparatus. N is a heater and K is a cooler, and R is a by-pass. V is the regulating valve. The inlet pipe divides into three parts passing through N, K, and R, respectively. The valve V is arranged to admit liquid from either N, R, or K alone, or R graduatingly with either N or K. S is a small motor which operates the valve V and is operated by the thermostat J. It is evident from this arrangement that the temperature of the entering liquid may be instantly changed, and the regulator is stable in its action. The fluid may be operated in a closed circuit or a fresh supply used, whichever is the more convenient.

The temperature of the water for humidifying the incoming air is regulated by the pressure of the steam in the pipes F, which may be readily controlled by a pressure regulator G on the entering steam pipe. The only requisite is that the water shall be warm enough to raise the dew point of the entering gas slightly above that required. It matters not within reasonable limits, how much above this temperature it is raised since the only effect would be to increase the amount of condensation on the pipe E. For economical working, however, the amount of condensation should be kept as low as practicable without danger of preventing it altogether. This may be easily determined by use of a small pipe not shown, leading from d to the outside, having a petcock on the end.

Fig. 3 represents an apparatus simplified for use with dry kilns or other chambers where atmospheric pressure is maintained. Here again I do not restrict myself to this or any particular form of apparatus. A A is a sheet metal box, containing water in the bottom which is heated by a steam pipe F F. The box contains a horizontal partition D just above the surface of the water, and above this is the condensing coil E E, the temperature of which is controlled in a similar manner to that in Fig. 1. The air or gas enters from a blower Y through the flue C, passes over the surface of the heated water m n, then back through the upper flue containing the condenser E, and thence through the heater H, where it is brought to the required final temperature at which it enters the chamber.

From the construction it is evident that any length of cylinder or pipe may be used, the length being suited to the purpose in question.

In this application I make no claim to the apparatus shown herein, as other forms and combinations may be used to carry out the same process.

I claim as new and desire to secure by Letters Patent:

1. The herein described method of regulating and controlling the humidity in gas consisting in first raising the dew point to a temperature above that required for the desired vapor tension, then lowering the dew point by condensing the surplus vapor to the temperature corresponding to the proper vapor tension, maintaining this vapor tension by controlling the temperature of the condensing surfaces or bodies and then heating the gas and vapor to the degree finally desired.

2. A method of regulating and controlling the humidity by using vapor whose dew point is above that corresponding to the desired vapor tension, then reducing the vapor tension to the desired amount by condensing the surplus vapor by reducing the dew point to the temperature corresponding to the desired vapor tension and maintaining this vapor tension by controlling the temperature of the dew point, and finally heating the vapor to the degree desired.

3. A method of regulating and controlling the humidity of gas in a closed chamber at pressure greater than atmospheric, consisting in first raising the dew point of a current of gas supplying the chamber, to a temperature above that corresponding to the desired vapor tension, then reducing the vapor tension to the desired amount by condensing the surplus vapor by reducing the dew point to the temperature corresponding to the desired vapor tension, maintaining this vapor tension by controlling the temperature of the condensing surfaces or bodies, and finally heating the gas and vapor to the degree desired, all operations being conducted at approximately the same pressure.

4. The herein described method of regulating and controlling the humidity of a gas within a chamber, by supplying a current of gas and first raising the dew point above that corresponding to the required vapor tension, by contact with heated water or vapor, then reducing the vapor tension to the required amount by condensing the surplus vapor and lowering the dew point to that corresponding to the required vapor tension, by bringing the gas and vapor in contact with condensing surfaces or bodies whose temperature is maintained at the dew point corresponding to the required vapor tension, and finally heating the gas and vapor to the temperature desired in the chamber.

5. A method of regulating and controlling the humidity within a chamber by causing a current of moist gas to come in contact with bodies or surfaces whose temperature is maintained at that of the dew point corresponding to the vapor tension required in the gas to give the desired humidity, then heating the gas and vapor to the final temperature desired in the chamber.

6. The herein described method of regulating and controlling the humidity within a chamber or vessel by supplying a current of gas and first raising its humidity by contact with heated water or vapor until its vapor tension exceeds that required, then reducing this vapor tension to the exact amount required, by condensing and removing the surplus vapor by contact with bodies or surfaces maintained at a temperature corresponding to the temperature of maximum vapor pressure required, and then heating the gas and vapor to the final degree desired.

HARRY D. TIEMANN.

Witnesses:
 THOMAS G. SHEARMAN,
 O. T. SWAN.